United States Patent
Hellegouarch et al.

(10) Patent No.: US 11,542,024 B2
(45) Date of Patent: Jan. 3, 2023

(54) LOAD-BEARING STRUCTURE INTENDED TO BE MOUNTED ON A GAS GENERATOR

(71) Applicant: SAFRAN AIRCRAFT ENGINES, Paris (FR)

(72) Inventors: Antoine Elie Hellegouarch, Crosne (FR); Marc Patrick Tesniere, Champcueil (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 281 days.

(21) Appl. No.: 16/954,737

(22) PCT Filed: Dec. 18, 2018

(86) PCT No.: PCT/FR2018/053364
§ 371 (c)(1),
(2) Date: Jun. 17, 2020

(87) PCT Pub. No.: WO2019/122680
PCT Pub. Date: Jun. 27, 2019

(65) Prior Publication Data
US 2021/0086906 A1    Mar. 25, 2021

(30) Foreign Application Priority Data

Dec. 18, 2017  (FR) ...................... 1762324

(51) Int. Cl.
*B64D 27/26* (2006.01)
*B64D 29/06* (2006.01)

(52) U.S. Cl.
CPC ............. *B64D 27/26* (2013.01); *B64D 29/06* (2013.01)

(58) Field of Classification Search
CPC .......................... B64D 27/26; B64D 2027/266
See application file for complete search history.

(56) References Cited

U.S. PATENT DOCUMENTS

| 2012/0111995 | A1 | 5/2012 | Lafont |
| 2014/0130512 | A1 | 5/2014 | Chouard et al. |
| 2015/0259074 | A1 | 9/2015 | Guillemaut et al. |

FOREIGN PATENT DOCUMENTS

| EP | 2067698 A1 | 6/2009 |
| FR | 2873985 A1 | 2/2006 |

(Continued)

OTHER PUBLICATIONS

Official Communication dated May 14, 2018, in FR Application No. 1762324 (2 pages).

(Continued)

*Primary Examiner* — Timothy D Collins
*Assistant Examiner* — Eric Acosta
(74) *Attorney, Agent, or Firm* — Bookoff McAndrews, PLLC

(57) ABSTRACT

A load-bearing structure is configured to be mounted on an engine core of a turbofan engine. The load-bearing structure comprises two longitudinal beams and a transverse connection connecting them. Each of the longitudinal beams comprises a forward mounting interface and a rear mounting interface for mounting the structure on the engine core while allowing at least the longitudinal travel of the engine core. Each longitudinal beam also comprises a lateral suspension point for transmitting longitudinal and vertical forces between the load-bearing structure and a suspension structure. The load-bearing structure further comprises a transverse connection comprising a central suspension point for transmitting lateral and vertical forces between the load-bearing structure and the suspension structure.

12 Claims, 8 Drawing Sheets

(56) References Cited

FOREIGN PATENT DOCUMENTS

| | | |
|---|---|---|
| FR | 2873988 A1 | 2/2006 |
| FR | 2993535 A1 | 1/2014 |
| WO | WO 2008/000924 A1 | 1/2008 |

OTHER PUBLICATIONS

International Search Report issued in International Application No. PCT/FR2018/053364 dated Mar. 21, 2019 (3 pages).

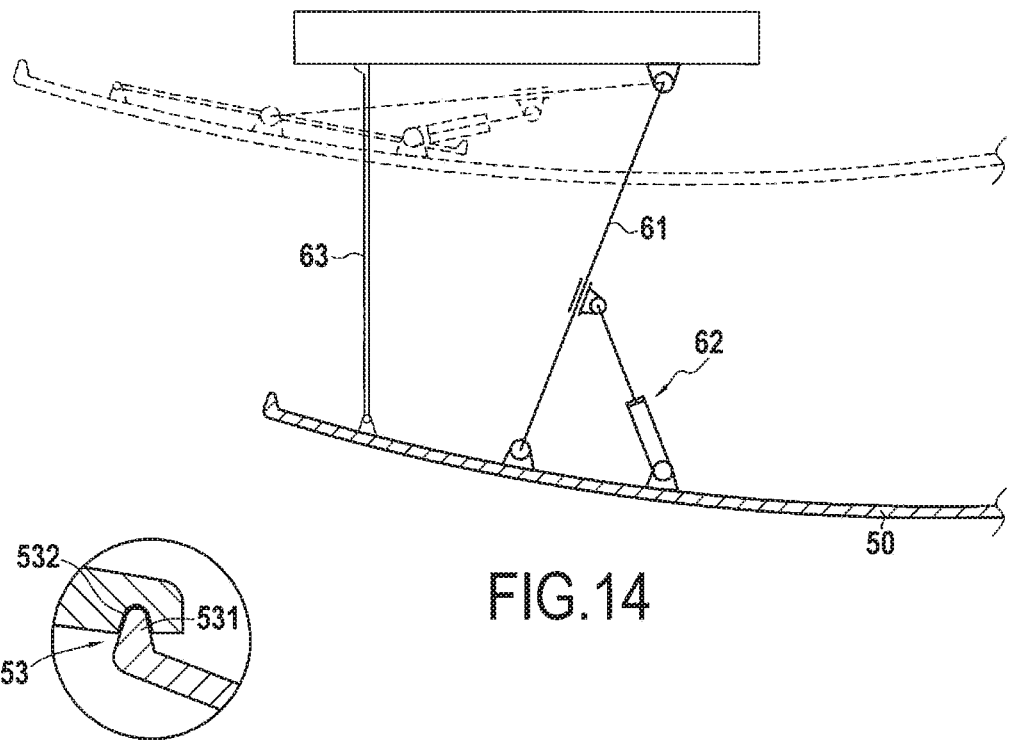
FIG.14
FIG.15
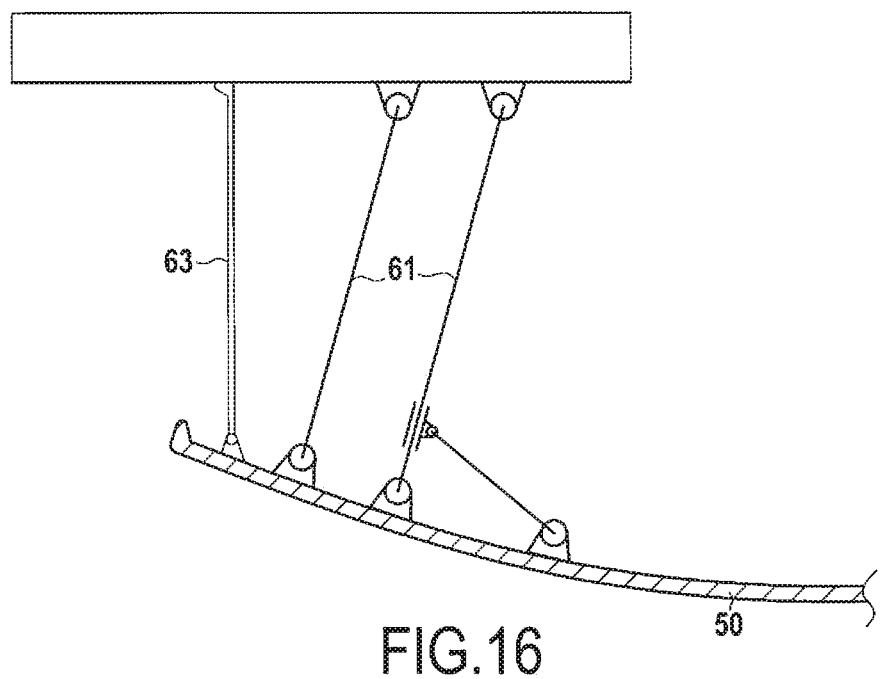
FIG.16

LOAD-BEARING STRUCTURE INTENDED TO BE MOUNTED ON A GAS GENERATOR

CROSS-REFERENCE TO RELATED APPLICATION(S)

This application is the U.S. national phase entry under 35 U.S.C. § 371 of International Application No. PCT/FR2018/053364, filed on Dec. 18, 2018, which claims priority to French Patent Application No. 1762324, filed on Dec. 18, 2017, the disclosures of which are incorporated herein in their entireties.

BACKGROUND OF THE INVENTION

The present invention relates to the field of suspensions of propulsion assemblies for aircraft, and more specifically a load-bearing structure configured to be attached to an engine core of a turbofan in order to allow its connection to a receiving structure of the aircraft, which can also be called the aircraft structure, via a suspension.

Typically, a turbofan is suspended from a receiving structure of the aircraft, for example a pylon attached, under the wing, to an intermediate casing forming a single part with the fan casing and a downstream suspension fastened to the turbine casing. This avoids a cantilever which would subject this engine to bending forces which can notably have an adverse effect on the adjustment of the compressor and turbine rotors in their respective housings.

However, such an arrangement has the drawback of a large bulk. With increasing thrusts and bypass rates, the diameter of the fans is also significantly increasing, which makes this arrangement increasingly bulky. Thus, when a turbofan engine with a high bypass rate is suspended from the wing of the aircraft in such an arrangement, the ground clearance of the aircraft can be insufficient to accommodate the propulsion assembly formed by the turbojet and its nacelle, thus requiring modifications to the nacelle and/or the landing gear, which can be costly and have a negative impact on the overall performance of the aircraft.

Thus, to remedy this drawback, several solutions have been proposed to suspend a turbofan engine only by its engine core, downstream of the fan. Thus, in certain solutions a structural shroud of the engine core incorporating a part of the pylon has been proposed to take up the bending forces, thus allowing the suspension of the turbofan engine through this structural shroud, despite the cantilevering of the fan. In the international application WO 2008/000924 A1 other concepts are proposed wherein the turbofan engine is suspended from a pylon through a structure attached to an intermediate casing of the engine core. This however involves the concentration of the forces, and in particular the bending forces, on the end of the pylon attached to these added structures, thus requiring considerable reinforcements with a consequent penalty in terms of added weight. These solutions all have the drawback of an added weight which can turn out to be more or less considerable.

Subject and Summary of the Invention

The present disclosure aims to remedy these drawbacks by proposing a load-bearing structure configured to be mounted on an engine core of a turbofan engine for an aircraft in order to connect the turbofan engine to a suspension structure without involving the casing of the fan while providing the take-up of the bending moments in the longitudinal direction without a large weight penalty. To do this, in a first aspect, this load-bearing structure, which can in particular be formed of a single-unit part, can comprise two longitudinal beams and a transverse connection connecting them, which can for example comprise an arch. Each of the two longitudinal beams can include at least a forward mounting interface and a rear mounting interface, for mounting the load-bearing structure on the engine core, and a lateral suspension point for transmitting lateral and vertical forces between the load-bearing structure and the suspension structure. The term "suspension point of the load-bearing structure" is understood to mean a fastener able to transmit forces between the load-bearing structure and the suspension structure. Since each fastener transmits forces at a fairly precise point, it can also be known as a fastening point.

Owing to these provisions, the distances between the center of gravity of the turbofan engine and the attachment points of each forward mounting interface, as well as between this center of gravity and the central suspension point, can be minimized, thus reducing the bending forces, which can be effectively taken up by the two longitudinal beams without a large penalty in terms of weight. Furthermore, the longitudinal travel permitted by the rear mounting interfaces, which can in particular each comprise longitudinal guiding means, makes it possible to accommodate the thermal expansion of the engine core in operation. These longitudinal guiding means can comprise a slide able to receive a slider mounted on a pad forming a single part with a turbine casing of the engine core, but it can also be considered to reverse this arrangement, to integrate the slider into the forward mounting interface, and the slide on the turbine casing of the engine core. In order to also accommodate the thermal expansion of the engine core in the lateral direction, the rear mounting interfaces can also be able to allow lateral travel of the engine core. To nonetheless provide a solid connection of this structure to the engine core, each forward mounting interface can be able to transmit longitudinal and transverse forces, for example by combining at least one bolt for transmitting traction forces and a dog for transmitting shear forces.

A second aspect of this disclosure relates to a structural assembly comprising this load-bearing structure and a suspension structure attached to the load-bearing structure by the rear and central suspension points. In order to ensure the transmission of the forces in two longitudinal planes, the suspension structure can comprise two suspension triangles, each attached to one of the corresponding rear suspension points, while, for transmitting forces in a transverse plane, the suspension structure can comprise a suspension portion, received in the longitudinal direction in a corresponding receptacle of the central suspension point. The central suspension point can comprise a ball joint, including a ball joint yoke wherein the receptacle is formed, in order to accommodate angular displacements between the load-bearing structure and the suspension structure. To provide the correct take-up of the forces in the transverse plane, the suspension structure can for example comprise a suspension pyramid, the suspension portion being located on an apex of the suspension pyramid.

Finally, a third aspect of the present disclosure relates to an aircraft comprising at least one receiving structure, a turbofan engine and the structural assembly connecting the turbofan engine to the receiving structure. The turbofan engine can thus be suspended, for example, from a receiving structure forming a single part of the wing of the aircraft, although it can also be considered to use the structural assembly for connecting the turbofan to a receiving structure directly forming a single part with the aircraft fuselage, in particular the aft fuselage.

BRIEF DESCRIPTION OF THE DRAWINGS

The invention will be clearly understood and its advantages will become more apparent on reading the following detailed description of embodiments shown by way of non-limiting example. The description refers to the appended drawings wherein:

FIG. 14 is a schematic top view of another variant of the deployment mechanism of FIG. 10, with the openable cowling in the open position, FIG. 15 is a detail view of a seal upstream of the openable cowling of FIG. 10, in the closed position, FIG. 16 is a schematic top view of yet another variant of the deployment mechanism of FIG. 10, with the openable cowling in the open position.

DETAILED DESCRIPTION OF THE INVENTION

Figure 1:
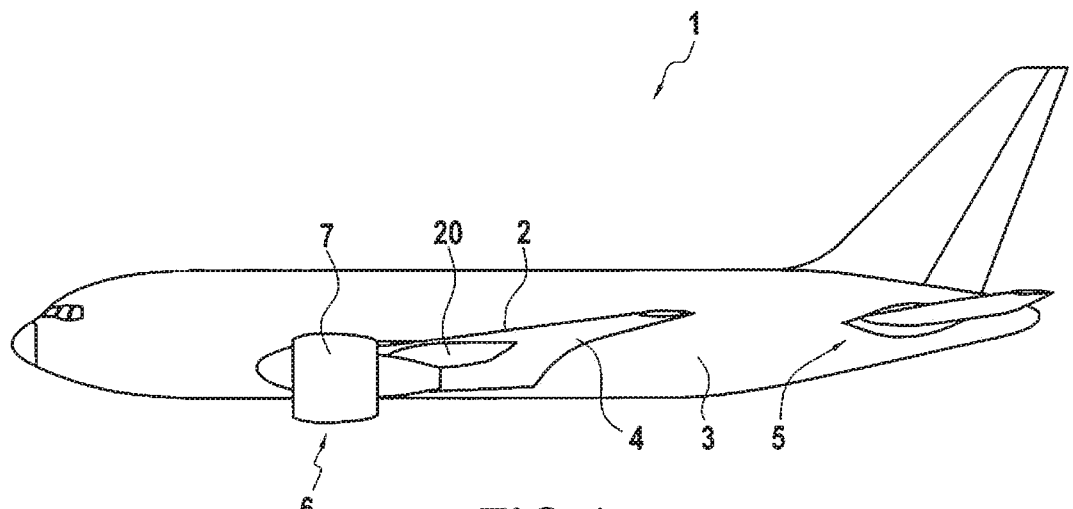
FIG. 1 is a perspective schematic view of an aircraft.

FIG. 1 illustrates an aircraft 1 comprising a fuselage 3, a wing 4 and a tail plane 5, and two propulsion assemblies 6 suspended, under the wing 4, from corresponding receiving structures 2. Each receiving structure 2 can form a single part with a respective wing from among the two wings of the wing 4. Although in FIG. 1, which is a side view of the aircraft 1, a single wing of this wing 4 is visible with its receiving structure 2 and its corresponding propulsive assembly 4, the aircraft 1 can be substantially symmetrical with respect to a longitudinal and vertical plane, in such a way that the other wing, with the respective receiving structure and propulsion assembly 6, is located on the hidden side of the aircraft 1, and is therefore not visible in this figure. In a manner known per se, each receiving structure 2 can comprise a pylon attached to the wing, for example by interfaces attached over at least one spar of the wing. However, alternatively or as a complement to such a pylon, the receiving structure can yet consist in a structural compartment of the wing.

Figure 2:
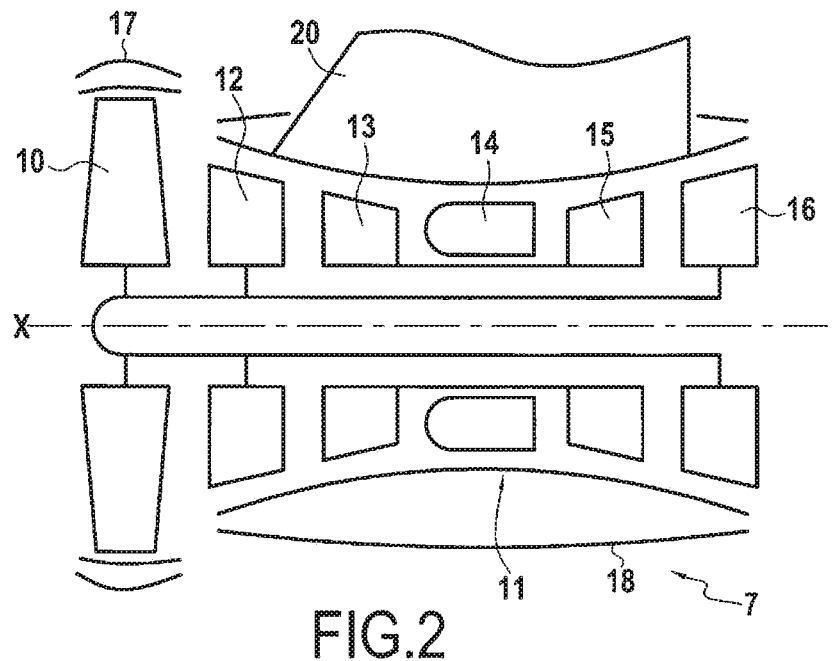
FIG. 2 is a schematic view in longitudinal section of a turbofan engine of the aircraft of FIG. 1.

Another identical or similar propulsion assembly 6 is also suspended from a second wing on the other side of the aircraft, not visible in the figure. Each of these two propulsion assemblies 6 can comprise a turbofan engine 7. As schematically illustrated in FIG. 2, this turbofan engine 7 can comprise a fan 10 and an engine core 11 formed by a low-pressure compressor 12, a high-pressure compressor 13, a combustion chamber 14, a high-pressure turbine 15 coupled to the high-pressure compressor 13 to actuate it, and a low-pressure turbine 16 coupled to the fan 10 and to the low-pressure compressor 12 to actuate them, aligned in the longitudinal direction along the longitudinal axis X which can also be the thrust axis of the turbofan engine 7. In each of the propulsion assemblies 6, the fan 10 and the engine core 11 receive respective fairings 17, 18.

In the aircraft 1 illustrated, the turbofan engine 7 can have a high bypass rate, for example greater than 5:1, 10:1, or even 15:1. The diameter of the fan 10 is therefore particularly large, in such a way that, to maintain sufficient ground clearance, since the illustrated aircraft 1 has a low wing, the fan 10 is offset upward and forward by comparison with a conventional layout. To achieve this offset, the fan 10 is not suspended from the receiving structure 2 forming a single part with the wing 4 but is retained only by its structural connections to the engine core 11. Thus, as illustrated in FIG. 1, the structural assembly 20 connecting each turbofan engine 7 to the wing is not directly fastened to the fan 10, but only to the engine core 11, with the fan 10 thus suspended cantilevered with respect to this assembly 20.

Figure 3:
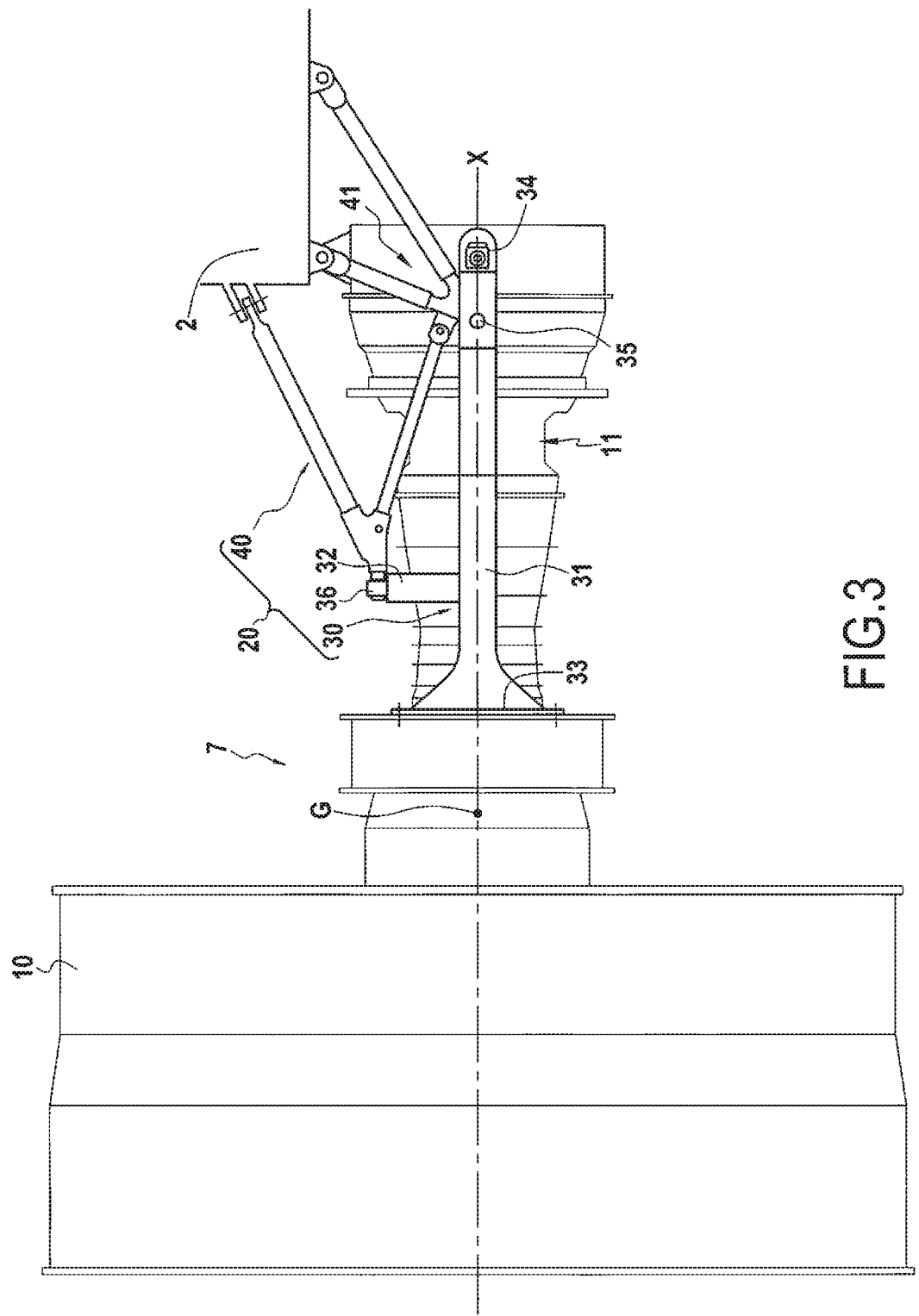
FIG. 3 is a lateral view of a structural assembly connecting the turbofan engine of FIG. 2 to a receiving structure of the aircraft of FIG. 1.
Figure 4:
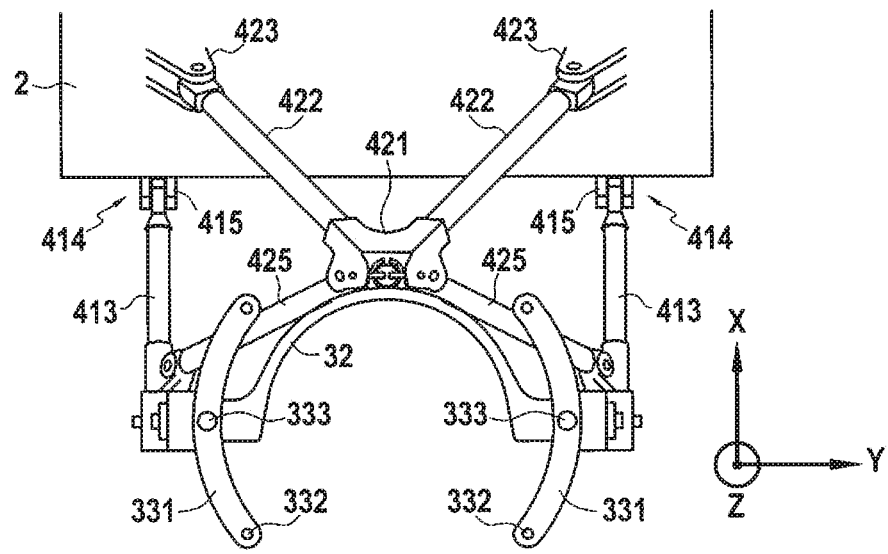
FIG. 4 is a front view of the structural assembly of FIG. 3.
Figure 5:
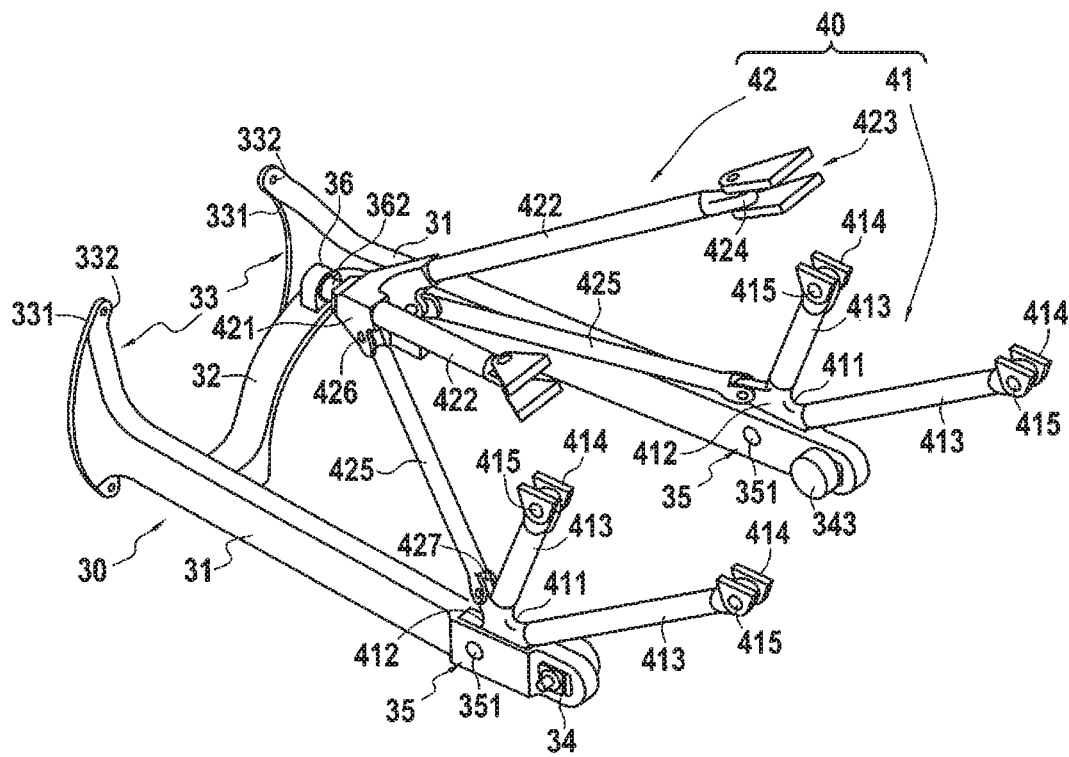
FIG. 5 is a rear three-quarter perspective view of the structural assembly of FIG. 3.

An exemplary embodiment of the assembly 20 is illustrated in FIGS. 3 to 5. Thus, as can be seen in these figures, this structural assembly 20 can comprise a load-bearing structure 30 configured to be attached onto the engine core 11 and a suspension structure 40 for connecting the load-bearing structure 30 to the receiving structure of the aircraft 1. More specifically, the load-bearing structure 30, which can in particular be formed of a single-unit part, can comprise two longitudinal beams 31 and a transverse connection 32 connecting them in a rigid manner. In the illustrated embodiment, this transverse connection 32 is in the form of an arch, but other forms can be envisioned for this transverse connection 32, such as for example a ring closed over 360°, forming a single body with the two longitudinal beams or attached onto them, which could further reinforce the rigidity of the load-bearing structure 30 in the transverse plane. As in the illustrated embodiment, each of the two longitudinal beams 31 can include at least one forward mounting interface 33 and one rear mounting interface 34, each interface being configured to mount the structure on the engine core 11, and a lateral suspension point 35 for connecting to the suspension structure 40. These lateral suspension points 35 on the longitudinal beams 31 can be complemented, as illustrated, by a central suspension point 36 for connecting to the suspension structure 40, located on the transverse connection 32.

Figure 6:
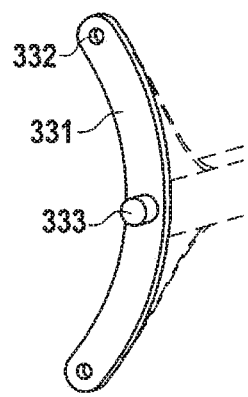
FIG. 6 is a detail view of a forward mounting interface of the structural assembly of FIG. 3.

As illustrated, each forward mounting interface 33 makes it possible to assemble the load-bearing structure 30 on the engine core 11. By definition, the engine core of a turbofan is traversed by the primary flow path of the turbofan and is surrounded by the secondary flow path of the turbofan. Each forward mounting interface 33 being attached to the engine core 11, it is radially located in an inter-path space between the primary flow path and the secondary flow path. Each forward mounting interface 33 can be configured to be attached to a casing located upstream of the high-pressure compressor 13 of the engine core 11, and axially downstream of a casing of the fan 10, for example a casing formed by an inter-compressor casing flange located between the low-pressure compressor 12 and the high-pressure compressor 13, and transmit forces both in the longitudinal direction and in a transverse plane perpendicular to the longitudinal axis X. To do this, as illustrated in detail in FIG. 6, each forward mounting interface 33 can comprise a plate 331 with through openings 332 for receiving bolts in order to transmit the longitudinal traction forces, and at least one dog 333 for transmitting transverse shear forces. These transverse forces can be both lateral, i.e. parallel to the lateral axis Y, and vertical, i.e. parallel to the vertical axis Z.

Figure 7:
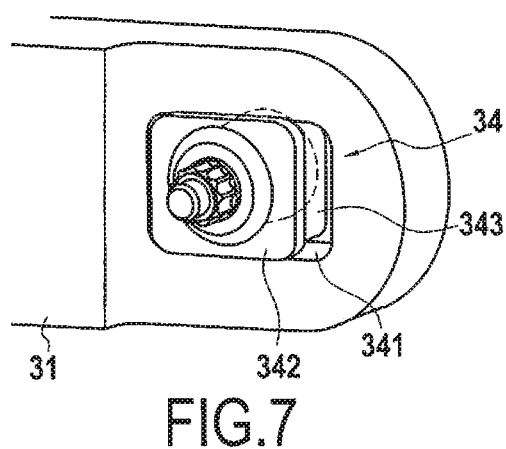
FIG. 7 is a detail view of a rear mounting interface of the assembly of FIG. 3.

In addition, each forward mounting interface 34 can be configured to be connected to a casing closer to the rear end of the engine core 11, for example a turbine casing, allowing the relative longitudinal and transverse travel of the engine core 11 with respect to this rear mounting interface 34, in such a way as to accommodate the thermal expansion of the engine core 11 in operation. Thus, as illustrated in FIG. 7, each rear mounting interface 34 can comprise a slide 341 for receiving a slider 342 mounted on a pad 343 forming a single part with the engine core 11, for example of a turbine casing of the engine core 11, allowing the travel of the slider 342 in the longitudinal as well as in the lateral direction. In this way, the rear mounting interfaces 34 will normally only transmit vertical forces for compensating for the longitudinal offset between the center of gravity G of the turbofan engine 7 and the forward mounting interfaces 33.

Thus, when the load-bearing structure 30 is mounted on the engine core 11, the latter can be attached between the two longitudinal beams 31, oriented parallel to the longitudinal axis X of the turbofan engine 7, in such a way that they take up the vertical bending moments, and particularly those generated by the cantilever of the fan 10 (including the fan casing also denoted by 10 in FIG. 3), thus relieving the casings of the engine core 11 of such forces.

Figure 8:
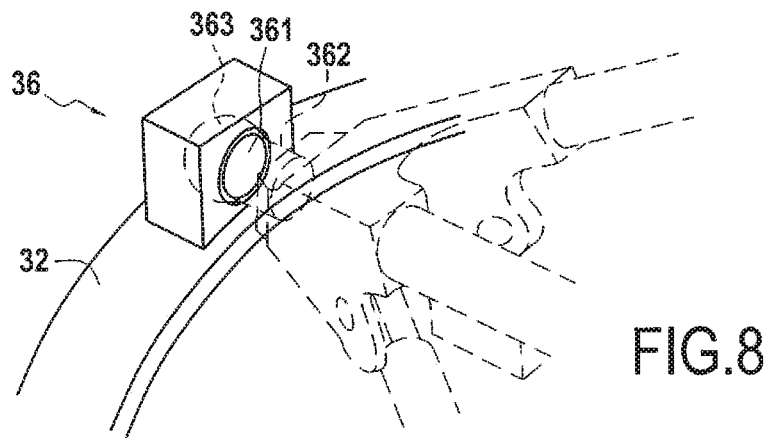
FIG. 8 is a detail view of a central suspension point of a variant of the structural assembly of FIG. 3.

The lateral suspension points 35 can be located on the rear ends of the longitudinal beams 31, near the rear mounting interfaces 34, and be configured to transmit longitudinal and vertical forces. To do this, each lateral suspension point 35 can for example comprise a pin 351 intended to be received, oriented in the lateral direction, in a corresponding opening in the suspension structure 40. The central suspension point 36 can be located, as illustrated, in the center of the transverse connection 32 straddling the engine core 11 when the structure is mounted thereon. The central suspension point can then directly overlook the longitudinal axis X of the turbofan engine 7, and be configured to transmit vertical and lateral forces in the transverse plane. To do this, the central suspension point 36 can comprise, as illustrated, an opening 361 configured to receive a suspension portion 362 oriented in the longitudinal direction. In a variant illustrated in detail in FIG. 8, the central suspension point 36 can also comprise a ball joint 363 comprising a ball joint yoke in which the opening 361 is formed, in order to allow angular travel of the suspension portion 362 in the central suspension point 36, and thus avoid the transmission of moments through the central suspension point 36.

As illustrated in FIGS. 3 to 5, the suspension structure 40 can comprise two suspension triangles 41, each configured to be connected by a lower tip 411 (FIG. 5) to one of the lateral suspension points 35 of the structure 30. When the lateral suspension points 35 comprise, as in the illustrated example, a number of pins 351, the yokes 412 intended to receive them can be formed in these lower tips 411 of the suspension triangles 41. Each suspension triangle 41 can be oriented in such a way as to transmit to the receiving structure 2 the vertical and longitudinal forces it receives through the corresponding lateral suspension point 35. In order to limit their weight, each suspension triangle 41 can be formed, as illustrated, by two rods 413 linked by the lower point 411, although it can also be considered to use a triangular plate 41' for each suspension triangle, as in the variant illustrated in FIG. 9. Each rod 413 of each suspension triangle 41 can be configured, as illustrated, to be connected, by its end opposite to the lower tip 411, to a fastening point 414 on the receiving structure 2, through an articulation 415 allowing at least angular travel in the plane of the suspension triangle 41, in such a way as to avoid the transmission of bending moments between the receiving structure 2 and each rod 413. These articulations 415 can also comprise ball joints to allow angular travel in other planes.

The suspension 40 can moreover also comprise, as illustrated, a suspension pyramid 42 configured to connect the central suspension point 36 of the structure 30 to the receiving structure 2. To do this, this suspension pyramid 42 can comprise an apex 421, wherein is formed the structure portion 362, and four rods meeting at the apex 421. More specifically, among these four rods, two upper rods 422 can be rigidly attached to the apex 421, extend toward corresponding fastening points 423 on the receiving structure 2, and be configured to be connected to these fastening points 423 through articulations 424 to prevent the transmission of bending moments, in this inclined plane, between each of the fastening points 423 and the corresponding upper rod 422. Two lower rods 425, each connected by corresponding articulations 426, 427 to the apex 421 of the suspension pyramid 42 and to the lower tip 411 of a respective suspension triangle 41, can complete the suspension pyramid 42 in such a way as to maintain the separation between the apex 421 of the pyramid 42 and the lower points 411 of the suspension triangles 41. The geometry of the suspension structure 40 can thus be maintained even when the load-bearing structure 30 is detached from it.

Figure 9:
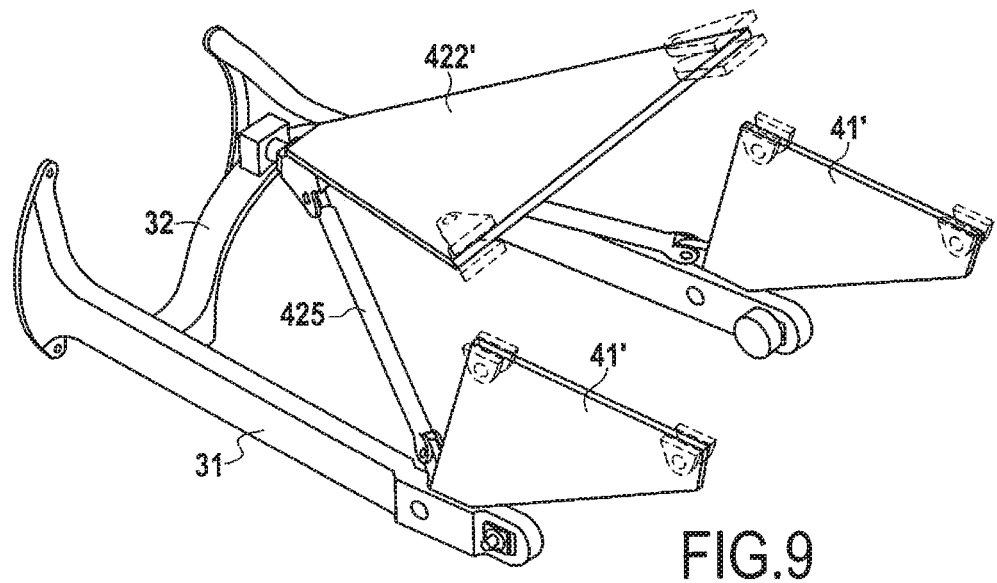
FIG. 9 is a rear three-quarter perspective view of a variant of the assembly of FIG. 3.

Like each of the suspension triangles 41, the two upper rods 422 could also be replaced by a triangular plate 422', oriented in the inclined plane and connected in a similar way to the apex 421 of the suspension pyramid 42 and to the fastening points 423 on the receiving structure 2, as in the variant illustrated in FIG. 9, wherein the elements equivalent to those of FIG. 5 are given the same reference numbers. The aerodynamic impact of such a plate 422' on the air flow in the secondary flow path of the dual-flow turbomachine can be controlled, for example by making holes in the plate 422', which also makes it possible to reduce its weight. Even if on the illustrated variant the triangular plates 41' and 422' each replace suspension triangles 41 as well as the upper rods 422, it can also be considered to replace only the upper rods 422 or one and/or the other of the two suspension triangles 41 in a mixed suspension structure combining rods and one or two triangular plates. Moreover, the plate 422', or even one or the other of the plates 41', may be used as a support for a surface heat exchanger, for example an air/air or air/oil exchanger.

Figure 11:
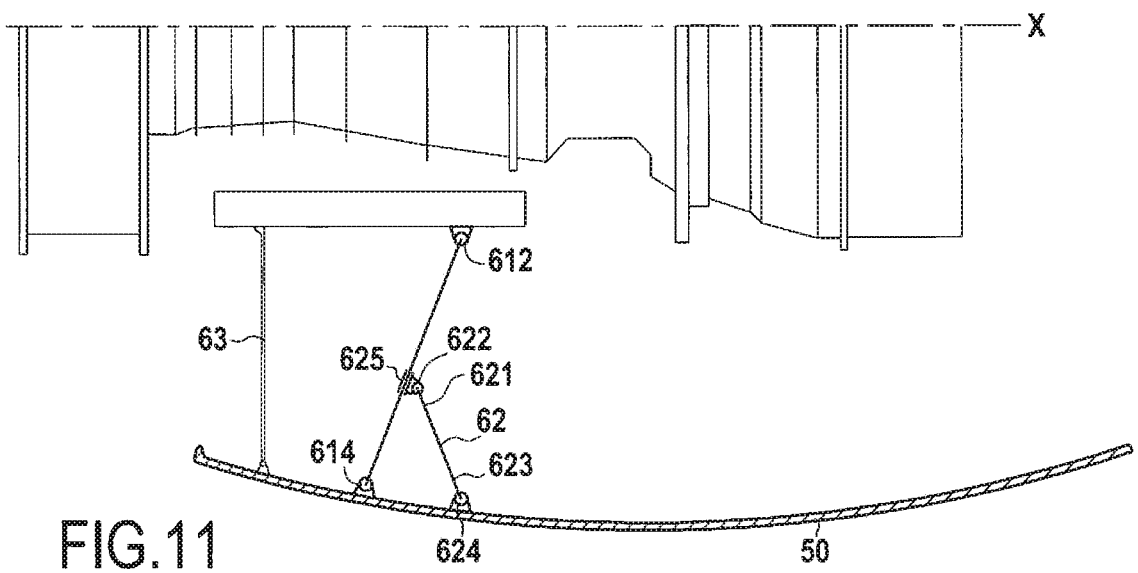
FIG. 11 is a schematic top view of the deployment mechanism of FIG. 10, with the openable cowling in the open position.
Figure 12:
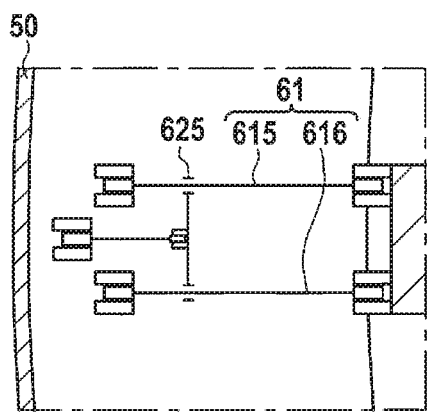
FIG. 12 is a schematic rear view of the deployment mechanism of FIG. 10, with the openable cowling in the open position.
Figure 13:
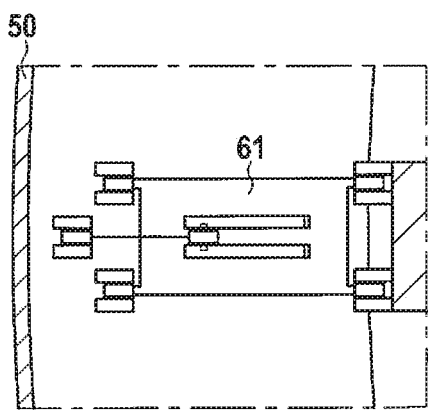
FIG. 13 is a schematic rear view of a variant of the deployment mechanism of FIG. 10, with the openable cowling in the open position.

In order to allow inspection, maintenance or even repair work on the engine core 11, its fairing 18 may comprise openable cowlings 50. Each openable cowling 50 can be located laterally with respect to the engine core 11 and be connected to the corresponding longitudinal beam 31 of the structure 30 by a deployment mechanism 60. According to a first embodiment, illustrated in FIGS. 10 to 12, this deployment mechanism can comprise a pivot arm 61, extending between a first end 611 connected to the longitudinal beam 31 by a first hinge 612 the axis of pivot of which can in particular be vertical, and a second end 613 linked to the openable cowling 50 by a second hinge 614, the axis of pivot of which can in particular be parallel to that of the first hinge 612. When the axes of pivot of the first and second hinges 612, 614 are parallel, this pivot arm 61 can be formed, as illustrated, by two parallel rods 615, 616, offset one with respect to the other along these axes of pivot, as illustrated in FIG. 12. However, it can also be considered that the pivot arm 61 be formed of one part, with a certain width along the axes of pivot, as in the variant illustrated in FIG. 13.

Figure 10:
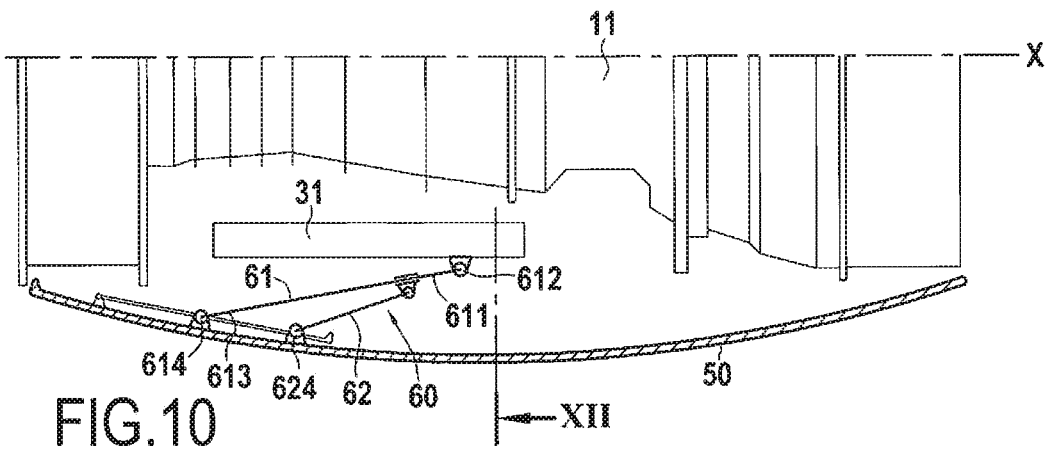
FIG. 10 is a schematic top view of a deployment mechanism interposed between an openable cowling of the engine core of the turbofan engine of FIG. 2 and a longitudinal beam of the assembly of FIG. 3, according to a first embodiment, with the openable cowling in the closed position.

In order to ensure the retaining of the openable cowling 50 in the open position and/or in the closed position, the deployment mechanism 60 can further comprise a retaining rod 62 extending between a first end 621, connected by a first articulation 622 to the pivot arm 61 between its two ends 611, 613, and a second end 623, connected by a second articulation 624 to the openable cowling 50. To allow the displacement of the openable cowling 50 between its open and closed positions, the first articulation 622 and/or the second articulation 624 of the retaining rod 62 can be mounted on slide rails 625, as illustrated in FIGS. 10 to 12, and/or the retaining rod 62 can be telescopic, as in the variant illustrated in FIG. 14. The deployment mechanism 60 can then also comprise a lock (not illustrated) for locking the retaining rod 62 when the openable cowling 50 is in the open position and/or in the closed position.

Moreover, the deployment mechanism 60 can also comprise, in addition or alternatively to the retaining rod 62, a cowling strut 63 able to be releasably attached between the longitudinal beam 31 and the openable cowling 50 in the open position for retaining this open position, and/or at least one lock (not illustrated) for locking the openable cowling 50 in the closed position by retaining it for example by its upper and/or lower edge, as illustrated in FIGS. 12 and 14.

To provide the sealing of the openable cowling 50 in the closed position, and contain fire, provision may be made for at least one seal 53 on its outer perimeter, and particularly on its upstream edge. As illustrated in FIG. 15, this seal 53 can comprise a rib 531 radially protruding inward on the edge of the openable cowling 50, and a groove 532 forming a single part with the engine core 11 and open radially outward to receive the rib 531 when the openable cowling 50 arrives in the closed position. This arrangement can however also be reversed, in such a way as to locate the rib on the engine core 11 and the groove on the openable cowling 50. As illustrated, the groove 532 can in particular have a V-shaped section.

In a variant illustrated in FIG. 16, the deployment mechanism 60 can comprise at least two pivot arms 61, parallel and offset with respect to one another in the longitudinal direction, connected in a similar way to the longitudinal beam 31 and to the openable cowling 50, to thus form with them a deformable parallelogram making it possible to retain the orientation of the openable cowling 50 during its opening and closing.

When opening the openable cowling 50 starting from the closed position illustrated in FIG. 10 with the deployment mechanism 60 according to this first embodiment, it is first possible to pivot the at least one pivot arm 61, after unlocking the lock 64 and/or the retaining rod 62, to laterally push aside the openable cowling 50 of the engine core 11 while also moving it downstream, and thus reach the open position illustrated in FIG. 11, in order to thus make accessible the engine core 11, for example for inspection, maintenance and/or repair work. It is finally possible to lock the deployment mechanism 60 in this open position with the lock of the retaining rod 62 and/or attach the cowling strut 63 between the longitudinal beam 31 and the openable cowling 50 in order to avoid untimely closing. These steps can then be reversed to close the openable cowling 50 again, by returning from the open position illustrated in FIG. 11 to the closed position illustrated in FIG. 10.

Figure 17:
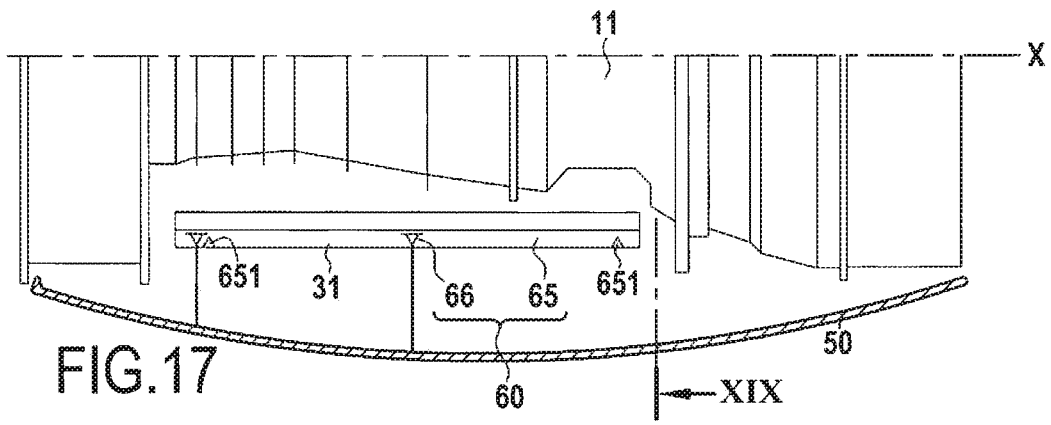
FIG. 17 is a schematic top view of a deployment mechanism according to a second embodiment, with the openable cowling in the closed position.
Figure 18:
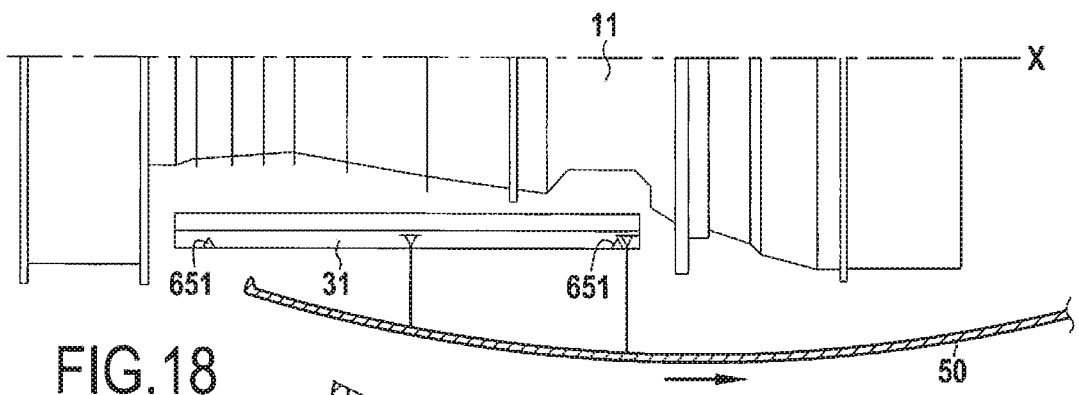
FIG. 18 is a schematic top view of the deployment mechanism of FIG. 17, with the openable cowling in the open position.
Figure 19:
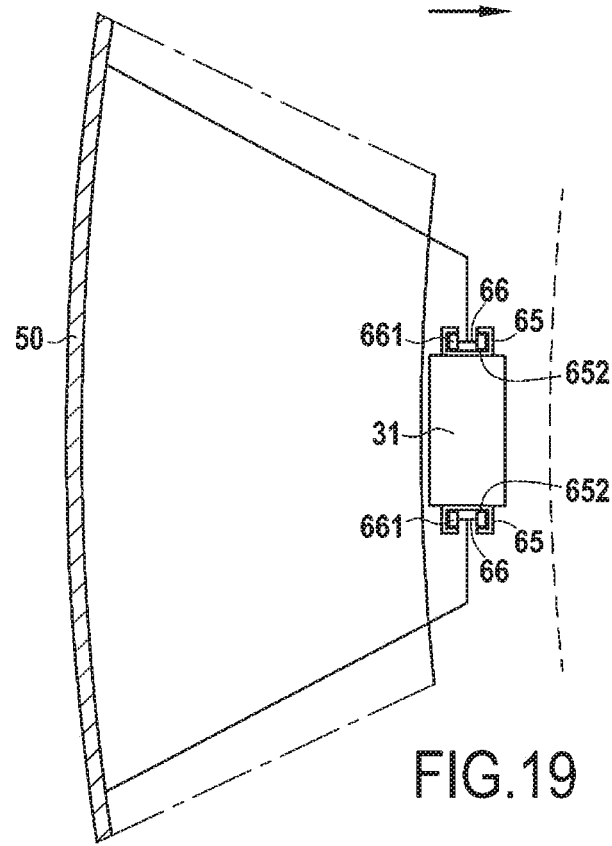
FIG. 19 is a schematic cross-section of the deployment mechanism of FIG. 17.

According to a second embodiment, illustrated in FIGS. 17 to 19, the deployment mechanism 60 can comprise, instead of one or more pivot arms, one or more slides 65 forming a single part with the longitudinal beam 31 and one or more sliders 66 forming a single part with the openable cowling 50 to allow the opening and closing of the openable cowling 50 by sliding the at least one slider 66 in the at least one slide 65. In particular, as illustrated in FIGS. 17 and 18, the slide 65 can be oriented along the longitudinal direction, to thus allow the longitudinal sliding of the openable cowling 50 between its open position and its closed position. As illustrated in FIG. 19, the deployment mechanism 60 can in particular comprise a first slide 65 located on an upper face of the longitudinal beam 31 and a second slide 65 located on a lower face of the longitudinal beam 31, each receiving at least two sliders 66 connected to the openable cowling 50 and mutually offset in the longitudinal direction.

In order to allow the retaining of the openable cowling 50 in the open and/or closed position, the slide 65 can include at least one lock 651 at the track end. Moreover, to facilitate their sliding, the sliders 66 can be provided with rollers 661 able to roll on rolling surfaces 652 in the slide 65, as illustrated in FIG. 19. The other illustrated elements being equivalent to those of the first embodiment, they are given the same reference numbers in FIGS. 17 to 19 as in the preceding figures.

When opening the openable cowling 50 starting from the closed position illustrated in FIG. 17 with the deployment mechanism 60 according to this second embodiment, and after unlocking at least one slider 66, it is possible to slide the openable cowling 50 longitudinally in the downstream direction toward the open position illustrated in FIG. 18, in order to thus make accessible the engine core 11, for example for inspection, maintenance and/or repair work. It is finally possible to lock the deployment mechanism 60 in this open position, in order to avoid untimely closing. These steps can then be reversed to close the openable cowling 50 again, returning from the open position illustrated in FIG. 18 to the closed position illustrated in FIG. 17.

Figure 20:
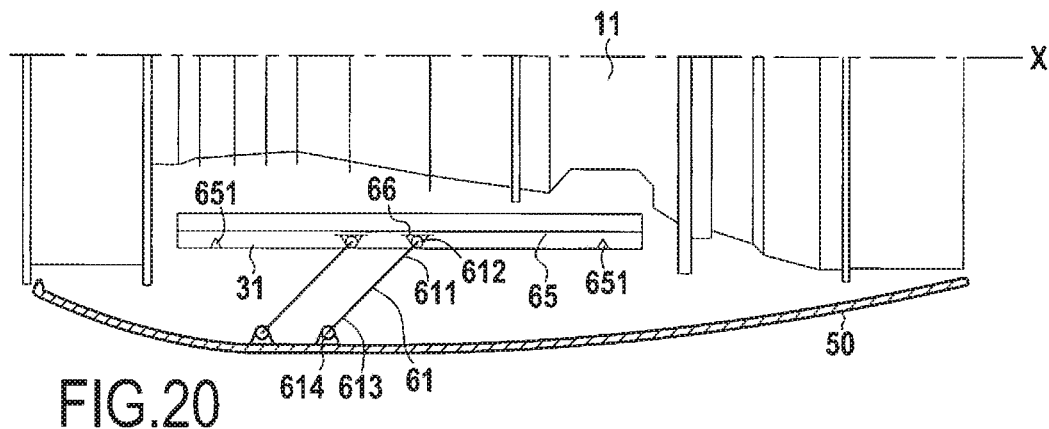
FIG. 20 is a schematic top view of a deployment mechanism according to a third embodiment, with the openable cowling in the closed position.
Figure 21:
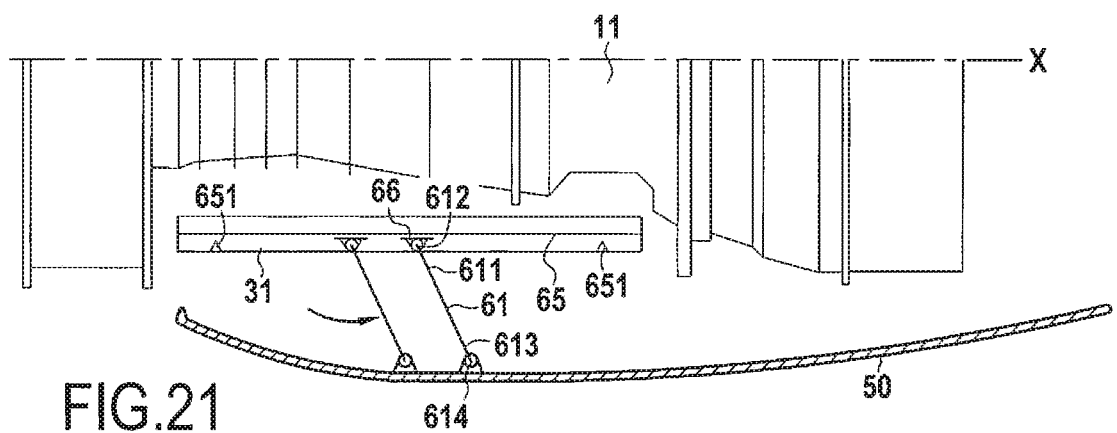
FIG. 21 is a schematic top view of the deployment mechanism of FIG. 20, with the openable cowling in the open position.
Figure 22:
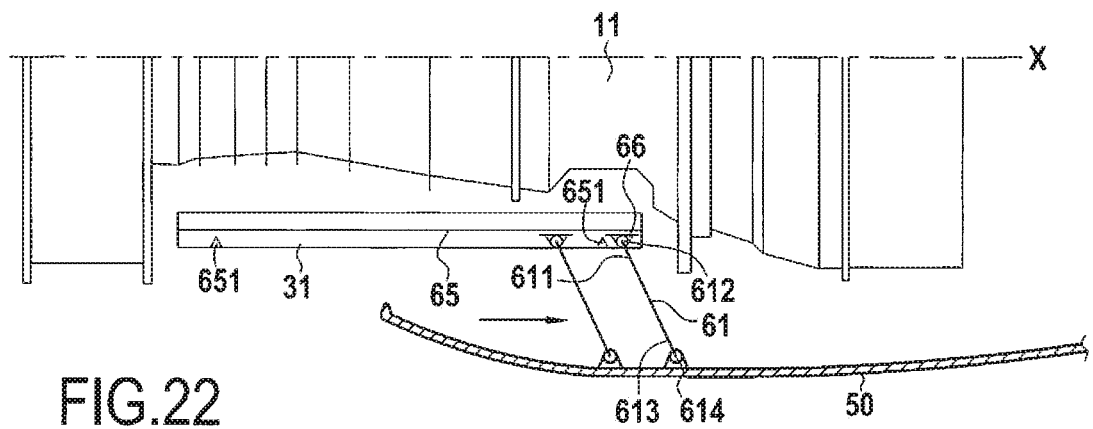
FIG. 22 is a schematic top view of the deployment mechanism of FIG. 20, with the openable cowling in the intermediate position between the open and closed positions.

In order to offer even better access to the engine core, it is also possible to combine pivot arm and sliding as in a deployment mechanism 60 according to a third embodiment illustrated in FIGS. 20 to 22. As illustrated, each slider 66 can then be connected to the openable cowling 50 by a pivot arm 61 extending between a first end 611 connected to the slider 66 by a first hinge 612, the axis of pivot of which can in particular be vertical, and a second end 613 connected to the openable cowling 50 by a second hinge 614, the axis of pivot of which can in particular be parallel to that of the first hinge 612. To allow the retaining of the openable cowling 50 in the open and/or closed position, the slide 65 can include at least one lock 651 at the track end, as in the second abovementioned embodiment, and at least one of the hinges 612, 614 can include a lock (not illustrated) for releasably locking the angular travel of the at least one pivot arm 61. The other illustrated elements being equivalent to those of the first two embodiments, they are given the same reference numbers in FIGS. 17 to 19 as in the preceding figures.

When opening the openable cowling 50 starting from the closed position illustrated in FIG. 20 with the deployment mechanism 60 according to this third embodiment, it is first possible to pivot the at least one pivot arm 61, after its unlocking, to laterally push aside the openable cowling 50 of the engine core 11 to thus reach the intermediate position illustrated in FIG. 22. Starting from this intermediate position and after unlocking the at least one slider 66, it is possible to slide the openable cowling 50 longitudinally in the downstream direction toward the open position illustrated in FIG. 21, in order to thus make accessible the engine core 11, for example for inspection, maintenance and/or repair work. It is finally possible to lock the deployment mechanism 60 in this open position, in order to avoid untimely closing. These steps can then be reversed to close the openable cowling 50 again, returning from the open position illustrated in FIG. 21 to the closed position illustrated in FIG. 20, passing once more through the intermediate position illustrated in FIG. 22.

Although the present invention has been described with reference to specific examples and embodiments, as well as to particular variants, it is obvious that different modifications and changes can be made to these examples and their variants without departing from the general scope of the invention as defined by the claims. For example, although for each embodiment there has only been given a description of a single openable cowling with a deployment mechanism on a side of the engine core, it can of course be considered to have such an openable cowling, and a corresponding deployment mechanism, on each side of the engine core. Furthermore, individual features of the different examples and embodiments described and their different variants can be combined in additional embodiments. Consequently, the description and drawings must be considered in an illustrative sense rather than a restrictive one.

The invention claimed is:

1. A load-bearing structure configured to be mounted on an engine core of a turbofan engine for an aircraft, the load-bearing structure comprising:

two longitudinal beams, each of the two longitudinal beams including:
a forward mounting interface and a rear mounting interface that are configured to mount the load-bearing structure on the engine core, the rear mounting interface configured to allow at least longitudinal travel of the engine core, and
a lateral suspension point configured to transmit longitudinal and vertical forces between the load-bearing structure and a suspension structure, and
a transverse connection connecting the two longitudinal beams and which comprises a central suspension point configured to transmit lateral and vertical forces between the load-bearing structure and the suspension structure.

2. The load-bearing structure as claimed in claim 1, wherein the rear mounting interfaces are configured to allow lateral travel of the engine core.

3. The load-bearing structure as claimed in claim 1, wherein each rear mounting interface comprises a longitudinal guiding means.

4. The load-bearing structure as claimed in claim 3, wherein the longitudinal guiding means of each rear mounting interface comprise a slide configured to receive a slider mounted on a pad forming a single part with a turbine casing of the engine core.

5. The load-bearing structure as claimed in claim 1, wherein each forward mounting interface is configured to transmit longitudinal and transverse forces.

6. The load-bearing structure as claimed in claim 1, wherein the load-bearing structure is formed of a single-unit part.

7. The load-bearing structure as claimed in claim 1, wherein the transverse connection connecting the two longitudinal beams further comprises an arch.

8. A structural assembly comprising: the load-bearing structure as claimed in claim 1; and a suspension structure attached to the load-bearing structure by the lateral suspension points and the central suspension points.

9. The structural assembly as claimed in claim 8, wherein the suspension structure comprises two suspension triangles, each attached to a corresponding one of the lateral suspension points.

10. The structural assembly as claimed in claim 8, wherein the suspension structure comprises a suspension portion, received in the longitudinal direction in a corresponding receptacle of the central suspension point, wherein the central suspension point comprises a ball joint including a ball joint yoke, and wherein the receptacle is formed in the ball joint yoke.

11. The structural assembly as claimed in claim 10, wherein the suspension structure further comprises a suspension pyramid, and wherein the suspension portion is located on an apex of the suspension pyramid.

12. An aircraft comprising at least one receiving structure, a turbofan engine, and the structural assembly as claimed in claim 8 connecting the turbofan engine to the receiving structure.

* * * * *